(12) United States Patent
Fu et al.

(10) Patent No.: US 7,148,185 B2
(45) Date of Patent: *Dec. 12, 2006

(54) VISCOELASTIC SURFACTANT FLUIDS STABLE AT HIGH BRINE CONCENTRATION AND METHODS OF USING SAME

(75) Inventors: Diankui Fu, Missouri City, TX (US); Yiyan Chen, Richmond, TX (US); Zhijun Xiao, Kuala Lumpur (MY); Mathew Samuel, Al-Khobar (SA); Sylvie Daniel, Jouy en Josas (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 268 days.

This patent is subject to a terminal disclaimer.

(21) Appl. No.: 10/249,830

(22) Filed: May 9, 2003

(65) Prior Publication Data

US 2003/0236174 A1  Dec. 25, 2003

Related U.S. Application Data

(63) Continuation-in-part of application No. 10/308,619, filed on Dec. 3, 2002, now abandoned.

(60) Provisional application No. 60/336,455, filed on Dec. 3, 2001, provisional application No. 60/382,179, filed on May 21, 2002.

(51) Int. Cl.
  *C09K 8/52* (2006.01)
  *C09K 5/58* (2006.01)
  *C09K 8/60* (2006.01)

(52) U.S. Cl. .................... 507/244; 507/240; 507/272; 507/277

(58) Field of Classification Search ................ 507/240, 507/244, 272, 277; 166/311, 312
See application file for complete search history.

(56) References Cited

U.S. PATENT DOCUMENTS

| 4,725,372 | A | 2/1988 | Teot et al. ............... 252/8.514 |
| 6,258,859 | B1* | 7/2001 | Dahayanake et al. ......... 516/77 |
| 6,762,154 | B1* | 7/2004 | Lungwitz et al. ........... 507/131 |
| 2003/0139298 | A1* | 7/2003 | Fu et al. .................... 507/200 |
| 2004/0023812 | A1* | 2/2004 | England et al. ............. 507/100 |
| 2004/0214725 | A1* | 10/2004 | Moss ........................ 507/129 |
| 2005/0003965 | A1* | 1/2005 | Xiao et al. .................. 507/100 |

FOREIGN PATENT DOCUMENTS

| WO | 98/56497 | 12/1998 |
| WO | 01/83946 | 11/2001 |
| WO | 02/24831 | 3/2002 |
| WO | 02/070862 | 9/2002 |
| WO | 03/048267 | 6/2003 |

OTHER PUBLICATIONS

U.S. Appl. No. 10/611,766 Hydraulic Fracturing Method.
U.S. Appl. No. 10/249,943 Hydraulic Fracturing Method.

* cited by examiner

*Primary Examiner*—Philip C. Tucker
(74) *Attorney, Agent, or Firm*—Thomas O. Mitchell; Tim Curington; Robin Nava

(57) ABSTRACT

A viscous aqueous high density well treatment fluid composition stable at high temperature containing a surfactant and inorganic salts is described. Methods of preparing the fluid and increasing the stability and viscosity of the fluid are given. The fluid is useful for wellbore cleanout, hydraulic fracturing, gravel packing, completion, acid diversion, lost circulation reduction, well killing, cementing, selective water shutoff, and fracture fluid diversion.

7 Claims, 15 Drawing Sheets

VISCOELASTIC SURFACTANT FLUIDS STABLE AT HIGH BRINE CONCENTRATION AND METHODS OF USING SAME

CROSS REFERENCE TO RELATED APPLICATIONS

This application is a continuation-in-part of U.S. patent application Ser. No. 10/308,619, filed Dec. 3, 2002, now abandoned, which is incorporated by reference in its entirety, and which claimed the benefit of U.S. Provisional Patent Application Ser. No. 60/336,455, filed Dec. 3, 2001. This application claims the benefit of U.S. Provisional Application Ser. No. 60/382,179, filed May 21, 2002.

BACKGROUND OF INVENTION

This invention relates generally to the art of making and using oilfield treatment fluids viscosified with surfactants that gel in aqueous systems. More particularly it relates to making and using such fluids that tolerate high density brines. Most particularly it relates to making and using such fluids that are more viscous at higher temperatures in high density brines than in low density brines.

Viscous fluids play an important role in oilfield service applications ranging from fracturing fluids, gravel pack fluids, drilling fluids, cleanout fluids, acid diverting reagents, fracture fluid diverting agents and many more. Nearly all of the traditional fluids for these applications are polymer based and have several intrinsic drawbacks due to their polymeric nature, such as irreversible formation damage and high friction pressure. A new technology based on viscoelastic surfactant (VES) fluids has several distinctive advantages over polymer-based fluids. VES based fluids are excellent particle suspension media. Unlike polymer fluids, when the VES systems break they form solids-free fluids, minimizing damage wherever they are used. However, many VES fluids are very sensitive towards high brine concentrations, especially heavy brines, often not gelling at all. Therefore their use as fluids for gravel pack applications, drill-in or completion fluids, especially for deep wells, and all other applications demanding heavy fluids to balance the well pressure is still very limited. In order to overcome these limitations new developments of brine insensitive fluids are necessary.

U.S. Patent Application Publication No. 2002-0033260, which is assigned to the assignee of the present application, describes a wellbore fluid made with a high brine carrier fluid having a density of at least 1.3 kg/L (10.8 pounds per gallon) containing 1) a component selected from organic acids, organic acid salts, and inorganic salts; 2) a co-surfactant that may be a) sodium dodecylbenzene sulfonate (SDBS), sodium dodecylsulfate (SDS) or a mixture of the two, or b) a hydroxyethylaminocarboxylic acid such as hydroxyethylethylenediaminetriacetic acid; and 3) a zwitterionic surfactant, preferably a betaine, most preferably an oleyl betaine. It is specifically indicated that zinc halides, especially zinc bromide, are not preferred. The co-surfactant or hydroxyethylaminocarboxylic acid are stated to be necessary for stability. The highest brine density in the examples at which a useful viscosity was maintained was 1.64 kg/L (13.7 pounds/gallon); the highest temperature in the examples is about 138 Â° C. (about 280 Â° F.).

U.S. patent application Ser. No. 10/065,144, which is assigned to the assignee of the present application, describes the optional addition of an alcohol, preferably methanol to an aqueous oilfield treating fluid containing erucylamidopropyl betaine surfactant (in an alcoholic solvent as purchased) and at least 15 percent by weight acid. The material is used as a diverting agent in carbonates, with which the acid reacts. The alcohol is said to compensate for any loss of alcoholic solvent during mixing of the fluid before pumping, and to improve the solubility of the surfactant in the high concentration of spent acid at high temperature, preventing the phase separation of surfactant from brine solution and thus improving the gel stability at high temperature.

There is still a need for simpler systems that can achieve greater thermal stability in more dense brines.

SUMMARY OF INVENTION

We have found that surfactant fluid gels, preferably erucylamidopropyl betaine viscoelastic surfactant fluid gels, can be made that are extremely stable to brines having densities above about 1.5 kg/L (about 12.5 ppg) at high temperatures. A first embodiment of the present invention is a viscous aqueous high density well treatment fluid composition containing a surfactant, preferably erucylamidopropyl betaine, but in general having the formula:

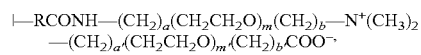

in which R is an alkyl group that contains from about 19 to about 23 carbon atoms which may be branched or straight chained and which may be saturated or unsaturated; a, b, a", and b" are each from 0 to 10 and m and m" are each from 0 to 13; a and b are each 1 or 2 if m is not 0 and (a+b) is from 2 to 10 if m is 0; a" and b" are each 1 or 2 when m" is not 0 and (a"+b") is from 1 to 5 if m is 0; (m+m") is from 0 to 14; and $CH_2CH_2O$ may also be $OCH_2CH_2$; and a salt or mixture of salts of a divalent cation or mixture of divalent cations forming a brine having a density above about 1.5 kg/L (about 12.5 ppg). Preferred salts are one or more of bromides and/or chlorides of calcium and/or zinc. Other salts, including organic ions and other valencies, may also be used.

Another embodiment of the present invention is a method of forming gels that are stable and viscous in high density brines from an aqueous mixture of a surfactant, preferably erucylamidopropyl betaine, but in general having the formula:

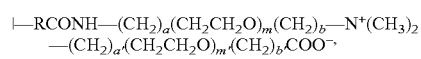

in which R is an alkyl group that contains from about 19 to about 23 carbon atoms which may be branched or straight chained and which may be saturated or unsaturated; a, b, a", and b" are each from 0 to 10 and m and m" are each from 0 to 13; a and b are each 1 or 2 if m is not 0 and (a+b) is from 2 to 10 if m is 0; a" and b" are each 1 or 2 when m" is not 0 and (a"+b") is from 1 to 5 if m is 0; (m+m") is from 0 to 14; and $CH_2CH_2O$ may also be $OCH_2CH_2$; and a salt or mixture of salts of a divalent cation or mixture of divalent cations forming a brine having a density above about 1.5 kg/L (about 12.5 ppg). Preferred salts are one or more of bromides and/or chlorides of calcium and/or zinc. Other salts, including organic ions and other valencies, may also be used.

Another embodiment of the present invention is a method of forming aqueous gels, that are more stable and viscous in high density brines than in low density brines or water, from an aqueous mixture of a surfactant, preferably erucylamidopropyl betaine, but in general having the formula:

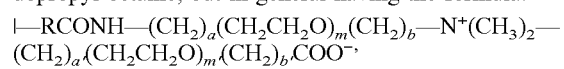

in which R is an alkyl group that contains from about 19 to about 23 carbon atoms which may be branched or straight chained and which may be saturated or unsaturated; a, b, a", and b" are each from 0 to 10 and m and m" are each from 0 to 13; a and b are each 1 or 2 if m is not 0 and (a+b) is from 2 to 10 if m is 0; a" and b" are each 1 or 2 when m" is not 0 and (a"+b") is from 1 to 5 if m is 0; (m+m") is from 0 to 14; and CH$_2$CH$_2$O may also be OCH$_2$CH$_2$; and a salt or mixture of salts of a divalent cation or mixture of divalent cations forming a brine having a density above about 1.5 kg/L (about 12.5 ppg). Preferred salts are one or more of bromides and/or chlorides of calcium and/or zinc. Other salts, including organic ions and other valencies, may also be used.

Another embodiment of the present invention is a viscous aqueous high density well treatment fluid composition containing a surfactant, preferably erucylamidopropyl betaine, but in general having the formula:

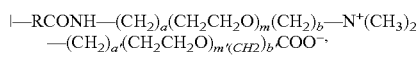

in which R is an alkyl group that contains from about 19 to about 23 carbon atoms which may be branched or straight chained and which may be saturated or unsaturated; a, b, a", and b" are each from 0 to 10 and m and m" are each from 0 to 13; a and b are each 1 or 2 if m is not 0 and (a+b) is from 2 to 10 if m is 0; a" and b" are each 1 or 2 when m" is not 0 and (a"+b") is from 1 to 5 if m is 0; (m+m") is from 0 to 14; and CH$_2$CH$_2$O may also be OCH$_2$CH$_2$; an alcohol, and a salt or mixture of salts of a divalent cation or mixture of divalent cations forming a brine having a density above about 1.5 kg/L (about 12.5 ppg). Preferred salts are one or more of bromides and/or chlorides of calcium and/or zinc. Other salts, including organic ions and other valencies, may also be used. The preferred alcohol is methanol.

Yet another embodiment of the present invention is a method of making aqueous gels, containing a surfactant, preferably erucylamidopropyl betaine, but in general having the formula: formula:

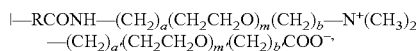

in which R is an alkyl group that contains from about 19 to about 23 carbon atoms which may be branched or straight chained and which may be saturated or unsaturated; a, b, a", and b" are each from 0 to 10 and m and m" are each from 0 to 13; a and b are each 1 or 2 if m is not 0 and (a+b) is from 2 to 10 if m is 0; a" and b" are each 1 or 2 when m" is not 0 and (a"+b") is from 1 to 5 if m is 0; (m+m") is from 0 to 14; and CH$_2$CH$_2$O may also be OCH$_2$CH$_2$; and a salt or mixture of salts of a divalent cation or mixture of divalent cations forming a brine having a density above about 1.5 kg/L (about 12.5 ppg), that are more stable and viscous in high density brines by the addition of an alcohol. Preferred salts are one or more of bromides and/or chlorides of calcium and/or zinc. Other salts, including organic ions and other valencies, may also be used. The preferred alcohol is methanol.

Yet another embodiment of the present invention is a method of making aqueous gels, containing a surfactant, preferably erucylamidopropyl betaine, but in general having, the formula:

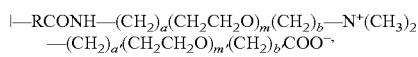

in which R is an alkyl group that contains from about 19 to about 23 carbon atoms which may be branched or straight chained and which may be saturated or unsaturated; a, b, a", and b" are each from 0 to 10 and m and m" are each from 0 to 13; a and b are each 1 or 2 if m is not 0 and (a+b) is from 2 to 10 if m is 0; a" and b" are each 1 or 2 when m" is not 0 and (a"+b") is from 1 to 5 if m is 0; (m+m") is from 0 to 14; and CH$_2$CH$_2$O may also be OCH$_2$CH$_2$; and a salt or mixture of salts of a divalent cation or mixture of divalent cations forming a brine having a density above about 1.5 kg/L (about 12.5 ppg), that are more stable and viscous in high density brines by increasing the density of the brines. Preferred salts are one or more of bromides and/or chlorides of calcium and/or zinc. Other salts, including organic ions and other valencies, may also be used.

According to further embodiments of the invention, gels sufficiently stable and viscous in high density brines are used at very high temperatures and long times in oilfield treatments and then degrade by decomposition of the surfactant rather than by destruction of the gel structure, without the need for dilution by formation water or brine or by oil or condensate, and without the need for addition of breakers or breaker precursors, so that the decomposition products will not damage formations, proppant or gravel packs, screens or wellbores; so that formation of sludges or emulsions with oils will be minimized; and so that none of the original surfactant will remain to affect wetability, form foams or have other deleterious effects sometimes observed when certain surfactants are present after oilfield treatments. This embodiment is possible because the surfactants can be made to gel at high temperatures at which they are stable for about the time required for oilfield treatments. According to other embodiments, the fluids may be used at lower temperatures with breakers.

Oilfield treatment method embodiments of the invention with these fluids include gravel packing, hydraulic fracturing (using the fluid in the pad and/or in the proppant stages), acid fracturing (using the fluid in the pad and/or in stages that alternate with acid stages), diversion, fluidloss pills, kill pills, temporary selective water shutoff, cementing, and wellbore cleanout. Particularly preferred embodiments include cleanout of undesired fluid and/or particulate matter from wellbores, especially horizontal or deviated wellbores, by injecting the fluids of the invention into the wellbores through coiled tubing so that they carry fluid and/or particulate matter out of the wellbores.

DETAILED DESCRIPTION

Figure 1:
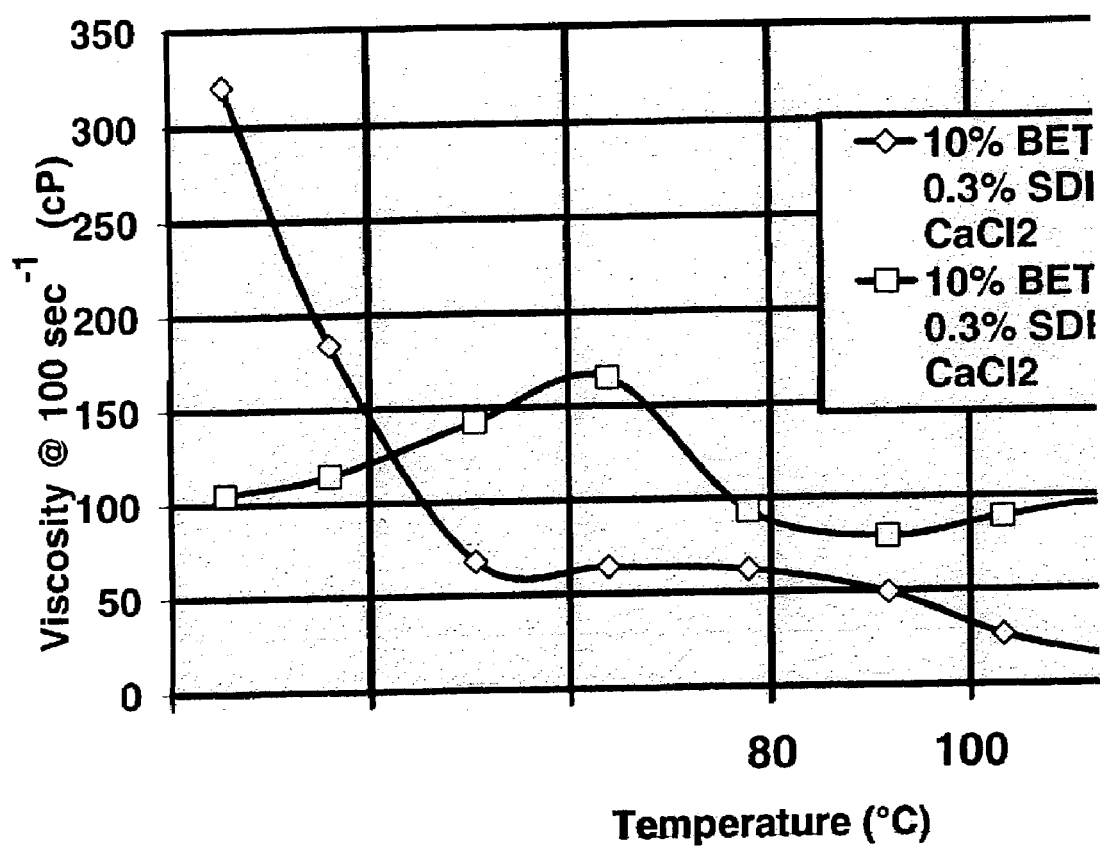
FIG. 1 shows the rheology of prior art viscoelastic surfactant gels in two brines.

We have found that certain surfactant fluid gels, for example erucylamidopropyl betaine surfactant fluid gels, can be made to be surprisingly stable in and tolerant of high salinity and high density (heavy) brines (defined as brines having a densities above about 1.5 kg/L (about 12.5 ppg). Many surfactants that form VES gels in aqueous systems will form gels only over a certain, often narrow, electrolyte concentration range; with too little salt, or too much, they will not form stable gels, and especially at high temperatures and in dense brines they will phase separate. Some surfactants are compatible with heavy brines, but not at high temperatures. For example, aqueous gels made from cationic surfactants, such as those made from 3% of a mixture of N,N'-bis-(2-hydroxyethyl)-N-methyl-9-octadecen-1-ammonium chloride, $C_{12}$–$C_{18}$ alkyl bis-(2-hydroxyethyl) ammonium chlorides, and $C_{20}$–$C_{22}$ alkyl bis-(2-hydroxyethyl) ammonium chlorides are compatible with heavy calcium brines, but only up to a temperature of about 71 Å° C. (160 Å° F.); when further mixed with 3% (Z)-13 docosenyl-N-N-bis (2-hydroxyethyl) methyl ammonium chloride, they form aqueous gels stable up to about 93 Å° C. (200 Å° F.) in heavy calcium brines.

However, several zwitterionic surfactants have been found to be particularly useful in forming aqueous gels of exceptional thermal stability even in high salinity and heavy brines. Their compatibility with heavy brines at unexpectedly high temperatures is an important feature of embodiments of the present invention. In general, suitable zwitterionic surfactants have the formula:

|—RCONH—$(CH_2)_a(CH_2CH_2O)_m(CH_2)_b$—$N^+(CH_3)_2$
—$(CH_2)_{a'}(CH_2CH_2O)_{m'}(CH_2)_{b'}COO^-$, in which R is an alkyl group that contains from about 19 to about 23 carbon atoms which may be branched or straight chained and which may be saturated or unsaturated; a, b, a", and b" are each from 0 to 10 and m and m" are each from 0 to 13; a and b are each 1 or 2 if m is not 0 and (a+b) is from 2 to 10 if m is 0; a" and b" are each 1 or 2 when m" is not 0 and (a"+b") is from 1 to 5 if m is 0; (m+m") is from 0 to 14; and $CH_2CH_2O$ may also be $OCH_2CH_2$. Preferred surfactants are betaines.

Two examples of betaines are, respectively, BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}$ $H_{41}$ alkene tail group) and is 40% active ingredient, with the remainder being substantially water, sodium chloride, and isopropanol. The surfactant in BET-E-40 is also shown below; one chemical name is erucylamidopropyl betaine. BET surfactants, and others, are described in U.S. Pat. No. 6,258,859. According to that patent, BET surfactants make viscoelastic gels when in the presence of certain organic acids, organic acid salts, or inorganic salts; the inorganic salts may be present at a weight concentration up to about 30%. Co-surfactants may be useful in extending the brine tolerance, and to increase the gel strength and to reduce the shear sensitivity of the VES-fluid, in particular for BET-O-type surfactants. An example given in U.S. Pat. No. 6,258,859,is sodium dodecylbenzene sulfonate (SDBS), also shown below. Other suitable co-surfactants for BET-O-30 are certain chelating agents such as trisodium hydroxyethylethylenediamine triacetate.

Betaines will gel aqueous solutions without the need for added salts, as is necessary for many other surfactants that form VES fluids. Preferred embodiments of the present invention use BET-E-40. Experiments have shown that addition of BET-E-40 improves the stability of BET-E-30 in heavy brines. Although experiments have not been performed, it is believed that mixtures of BET-E-40 with other surfactants (as with BET-O-30) will also form stable aqueous gels, in heavy brines, that are more stable than gels made with the other surfactants but without the addition of BET-E-40. Such mixtures are within the scope of embodiments of the invention. invention.

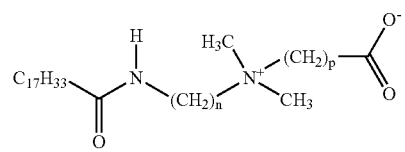

Surfactant in BET-O-30 (when n=3 and p=1)

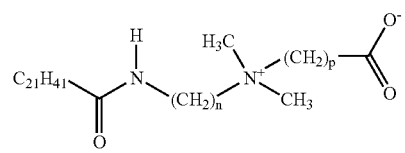

Surfactant in BET-E-40 (when n=3 and p=1)

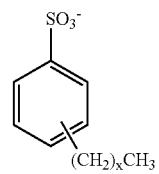

SDBS (when x=11 and the counterion is $Na^+$)

Other betaines that are suitable include those in which the alkene side chain (tail group) contains 19 23 carbon atoms (not counting the carbonyl carbon atom) which may be branched or straight chained and which may be saturated or unsaturated, n=2–10, and p=1–5, and mixtures of these compounds. More preferred betaines are those in which the alkene side chain contains 17 21 carbon atoms (not counting the carbonyl carbon atom) which may be branched or straight chained and which may be saturated or unsaturated, n=3–5, and p=1–3, and mixtures of these compounds.

Although the surfactant embodiments of the invention are preferably used without co-surfactants, they may be used with co-surfactants, for example those having the above structure in which x=5 15; preferred co-surfactants are those in which x=7 15.

A problem with some VES fluids based on surfactants other than those of embodiments of the present invention is their tendency to separate into two phases in the presence of high electrolyte concentrations. A surfactant layer on top of a water layer is commonly observed. To prevent this, a system robust towards high brine concentrations is advantageous. We have observed that a fluid containing 10% BET-O-30 and 0.3% SDBS in 160% $CaBr_2$ (1.79 kg/L) (14.94 ppg (pounds per gallon)) shows no tendency for phase separation, although this specific system has a low viscosity. Similarly, phase separation was not observed when aqueous gels of BET-E-40 were heated in heavy divalent brines and then cooled. In the examples that follow, only the viscosities were measured at high temperatures.

The fluids of embodiments of the invention are particularly useful for cleaning out wellbores. Particles, such as beads, may be used in jetting operations in wellbores and afterward it may be desirable to remove this material. Produced "sand" (including proppant) accumulating in the production tubing during fluid flow to the wellbore can greatly restrict hydrocarbon production. Other undesired particulates such as cuttings, fibers, other proppant flowback control agents, fluid loss additives, and debris, including debris formed by perforating, may be present. In horizontal or deviated wells, undesired fluids, that may or may not contain solid particles, may accumulate in low spots. Coiled tubing (CT) has been widely used as a means to clean out materials from a wellbore. Fluids used for coiled tubing cleanout should have low friction pressure (to minimize hydraulic horsepower requirements) and sufficient viscosity for good material carrying and/or displacing capability to aid in carrying and/or displacing the material to the surface for disposal. Normally, light fluids are preferred to reduce the possibility of fracturing and to minimize the hydraulic horsepower needed to return the fluid to the surface.

However, operators are now working in wells that are so deep that the temperatures and pressures are extremely high. At high pressures it is necessary to weight the fluid with heavy brine in order to balance the formation pressure, and maintain control of the well, despite the expense and other drawbacks. It is also necessary for the fluid viscosity to be stable under high temperature conditions, because many deep wells have bottom hole static temperatures (BHST"s) of 149 Â° C. (300 Â° F.) or more. Some have BHST"s of 204 Â° C. (400 Â° F.) or more. Introduction of fluids from the surface may cool the formation or bottom of the well. The fluids of embodiments of the present invention are the VES fluids that can best meet the density and stability requirements. VES fluid systems are advantageously used for coiled tubing cleanout applications, in particular in horizontal or inclined wellbores, because VES fluids have superior drag reduction properties (that is, low friction pressures); they can be foamed; they generally undergo "disruptive shear thinning" (see below) at high shear rates (high flow rates and/or great turbulence in the tubing); the very low viscosity fluid that has undergone disruptive shear thinning can enter the sand mass and pick the sand up easily; and since they recover viscosity quickly, the sand will remain suspended as it is moved back up the wellbore. However, many VES systems are not compatible with the high-density brine used to increase the fluid density.

Other important uses for these fluids include hydraulic fracturing (using the fluid in the pad and/or in the proppant stages), acid fracturing (using the fluid in the pad and/or in stages that alternate with acid stages), gravel packing, frac-packing, diversion, fluid loss pills for reduction of lost circulation, kill pills for preventing flow of fluid from a well, in leakoff control acids, in drill-in and completion, in temporary selective water shutoff, in cementing and in other oilfield treatment uses. Viscosities during use of at least about 30 to about 50 cP measured at a shear rate of 100 $sec^{-1}$ are preferred for these uses. In some applications, such as gravel packing and frac packing with a tip screenout, it may be possible to use VES fluids which have lower viscosities under appreciable shear. Those skilled in these operations are familiar with equipment and procedures adapted for employing viscous and/or dense fluids.

Although the uses are described in terms of producing wells for oil and/or gas, the fluids and methods may also be used for injection wells (such as for enhanced recovery or for storage) or for production wells for other fluids such as carbon dioxide or water.

High density brines for oilfield use are usually made from salts of divalent metals such as calcium and zinc, although brines made from potassium, ammonium, sodium, cesium and the like may also be used. Organic cations such as ammonium and tetramethylammonium may also be used. Typical inorganic anions for high density brines include chloride and bromide, although organic anions such as formate and acetate may also be used. Some of the salts made from some combinations of these anions and cations may not impart sufficient density and may have to be used in combinations with other anions and cations that give higher density brines. Such mixtures are within the scope of embodiments of the invention, as are brines containing any other salts provided that none of them disrupts the structures giving rise to the surfactant gels in high density brines to the point where they no longer give sufficiently stable high viscosity gels at the temperatures at which they are needed. It should be understood that when a fluid is described as being made by adding a salt, this may mean by combining anhydrous or hydrated salts with a fluid or by combining a brine (such as a concentrated or saturated brine) with a fluid, and the combining may be done in any order.

Similarly, other additives such as alcohols, polymeric materials, other surfactants, chelating agents and the like may be included, again provided that none of them disrupts the structures giving rise to the surfactant gels in high density brines to the point where they no longer give stable high viscosity gels at the temperatures at which they are needed. As-received surfactants often include lower alcohols (like propanols) and/or glycols to reduce their viscosities and/or to lower their freezing points to make them easier to handle and use. In embodiments of the present invention, addition of alcohols is intended to mean in addition to alcohols already present in the as-received material.

Some alcohols are known to stabilize aqueous BET gels. U.S. Pat. No. 6,258,859 describes addition of alcohols to betaines. These alcohols are described as medium to long chain alcohols (preferably alkanols), preferably having five to ten carbon atoms. We have found that methanol, ethanol, isopropanol, and mixtures of these alcohols stabilize fluid embodiments of the invention. The preferred alcohol is methanol. The alcohol if added, is added in an amount up to about 10 volume percent, preferably in an amount of about 1 to about 6 volume percent.

In a typical formulation, sufficient as-received surfactant mixture is used to form a fluid that contains about 0.2 to about 20% active surfactant, with a preferred concentration range of from about 1 to about 12% active surfactant. Describing the procedure in terms of oilfield use, the surfactant, water and salt may be blended in any order either in the field or at a separate location. Alternatively, some of the components can be premixed on site or at a separate location and then one or more other component(s) may be added later. The fluids may be batch mixed or mixed on the fly. Other additives required for typical oilfield treatments can normally be included, provided that none of them disrupts the structures giving rise to the surfactant gels in high-density brines to the point where they no longer give sufficiently stable high viscosity gels at the temperatures at which they are needed. The fluid can be pumped as a liquid, energized, or foamed, for example with nitrogen. Although no experiments have been performed, it is believed that carbon dioxide can also be used. It is believed that air can also be used provided that oxidative degradation does not occur or is controlled.

Another advantage of the fluids and methods of embodiments of the invention is that the aqueous gelled fluids are shear thinning but not shear degrading. Shear thinning in this context is used with the conventional meaning for a viscous fluid: as the shear rate is increased, the viscosity decreases. This type of shear thinning is reversible; that is, the viscosity increases again if the shear rate is decreased. Shear thinning is beneficial because this behavior reduces the hydraulic horsepower required during pumping. Shear degradation is a deficiency of fluids thickened with polymers, especially crosslinked polymers; their chemical bonds are permanently broken and they do not recover their viscosity (reheal) when the shear rate is reduced or shearing is stopped.

There is a second type of shear thinning undergone by surfactant-based aqueous gels (but not crosslinked polymer-based aqueous gels) whose viscosity is caused by a temporary structure such as a micelle. Although we do not intend to be limited by theory, we believe that this second type of shear thinning is caused by temporary disruption of the structure, so we will call it "disruptive shear thinning". Disruptive shear thinning is characterized by an almost complete loss of viscosity such that above a certain shear rate the viscosity of the fluid is close to that of water. Whether or not VES fluids undergo disruptive shear thinning is primarily a function of the shear rate, the nature and concentration of the surfactant, the temperature, the nature and concentration of co-surfactants and other additives (such as alcohols) if they are present, and the nature and concentration of electrolytes if they are present. Disruptive shear thinning is reversible; when the shear rate is reduced, the structure reforms and the viscosity returns. The disruption and recovery take time and each can be retarded or accelerated by additives.

Only conventional shear thinning was observed for any of the fluids at the shear rates of any of the examples given here; disruptive shear thinning, if it were to occur, would be observed only at higher shear rates that might be encountered during pumping down wellbores, especially at restrictions in equipment.

In oilfield applications disruptive shear thinning may be desirable or undesirable. For gravel packing or hydraulic fracturing, disruptive shear thinning is undesirable because when the fluid is temporarily very thin it cannot suspend the gravel or proppant. Conventional shear thinning is acceptable provided that the fluid remains sufficiently viscous to transport the gravel or proppant. BET-E-40 fluids generally do not undergo disruptive shear thinning (although it cannot be ruled out for all formulations and if disruptive shear thinning is important, specific fluid formulations should be tested), and so would be particularly suitable for gravel packing or hydraulic fracturing. The fluids of embodiments of the present invention are particularly useful in gravel packing, where the high-density fluids carry the gravel to the bottom of the wellbore with a minimal amount of pumping (little hydraulic horsepower needed) because of the density difference between the gravel packing fluid and the fluid already in the wellbore.

For coiled tubing cleanout treatments, disruptive shear thinning is desirable because this makes it easier to create turbulence during the treatment and the turbulence aids the fluid in entraining the particles that the treatment is intended to remove from the well. It is beneficial in coiled tubing cleanouts to impart a slight delay in regaining full viscosity in order to more efficiently "jet" the solids from the bottom of the wellbore into the annulus. Once the particles are entrained and in the annulus, the regained viscosity of the fluid will ensure that the solids are effectively transported to the surface. Improving the viscosity-recovery and minimizing the time required for such recovery is therefore desirable. An agent that promotes disruptive shear thinning may be added, provided that it does not disrupt the structures giving rise to the surfactant gels in high density brines to the point where they no longer give sufficiently stable high viscosity gels at the temperatures at which they are needed. However, after the particles are entrained, higher viscosity helps the fluid to carry the particles to the surface, so it is desirable for the disruptive shear thinning to be temporary. (As with any additive, laboratory tests should be conducted to ensure compatibility of the disruptive shear thinning agent with the fluid, and to ensure that the disruptive shear, thinning agent does not interfere with the performance of the fluid. Conducting such tests on any additive or additives is considered to be within the scope of the invention.)

Commonly, when viscous fluids are used in oilfield treatments or applications, there are sometimes situations in which it is desirable for the viscosity to decrease permanently after the fluids have served their purpose. Also, when surfactants are used in oilfield applications, there are sometimes situations in which it would be desirable for the surfactants no longer to be present after they have served their purpose. Often the time at which the viscosity or the surfactant are no longer desirable is a period of several hours after the treatment has ended. Consequently, an advantage in the use of the fluids and methods of embodiments of the present invention is that gels can be formed at temperatures at which the surfactants do not have long term thermal stability. As a result, the gels will eventually degrade at high temperatures without the need for either a) dilution by formation water or oil or condensate, or b) addition of a separate breaker or breaker precursor. The time at which this degradation occurs at a given temperature can be controlled by the choice of surfactant, surfactant concentration, other additives, and brine. Although not necessarily needed, it is within the scope of embodiments of the invention to employ additional breakers or breaker precursors especially at lower temperatures, such as some of those described in U.S. Patent Application Publication No. 2002-0004464, assigned to the same assignee as the present application, if desired. It should be noted that not all of the breakers and breaker precursors described in that application will be satisfactory for all of the surfactants described in the present application. Other breakers that may be used are described in U.S. Patent Application Publication No. 2002-193257, assigned to the same assignee as the present application.

EXAMPLE 1

(Prior art; described in U.S. Patent Publication No. 2002-0033260, assigned to the assignee of the present application.) FIG. 1 shows the rheology of 10% BET-O-30 with 0.3% SDBS in two different $CaCl_2$ brines. Fluids were prepared by mixing as-received BET-O-30 with SDBS and then adding the mixture to the brines in a blender. The fluids were then degassed at 82° C. (180° F.) in a water bath overnight before rheology measurements. (This degassing procedure was used only in the experiments of example 1 and is not normally done in the field. Consequently, it is possible that in the experiments describing embodiments of the invention or in the field—there could be some oxidative degradation of surfactant.) The fluid viscosity was recorded on a Fann 50 Model rotational viscometer that can be pressurized up to 895 kPa (1000 psi). Because the salts used were hydrates with unspecified molecular weights, the densities were measured at room temperature. $CaCl_2$ and $CaBr_2$ have at least one mole of hydrated water per mole of salt. Therefore the salt concentrations specified in the experimental data may not be precise. The concentrations of the as-received surfactant mixtures added to the fluids are given in volume percent; the concentrations of the added salts and other solids are given in weight percent. (For example, "100 weight percent $CaBr_2$" means that a weight of salt equal to the weight of water was added to the water.)

It can be seen that increasing the $CaCl_2$ concentration from 48% to 80% (increasing the fluid density up to 1.29 kg/L (10.74 ppg (pounds per gallon))) changed the rheology profile. The maximum temperature at which useful viscosities were obtainable was over 127° C. (260° F.). An increase in the brine concentration had a beneficial effect on the viscosity; the maximum temperature and the average viscosity became higher over an extended temperature range.

Figure 2:
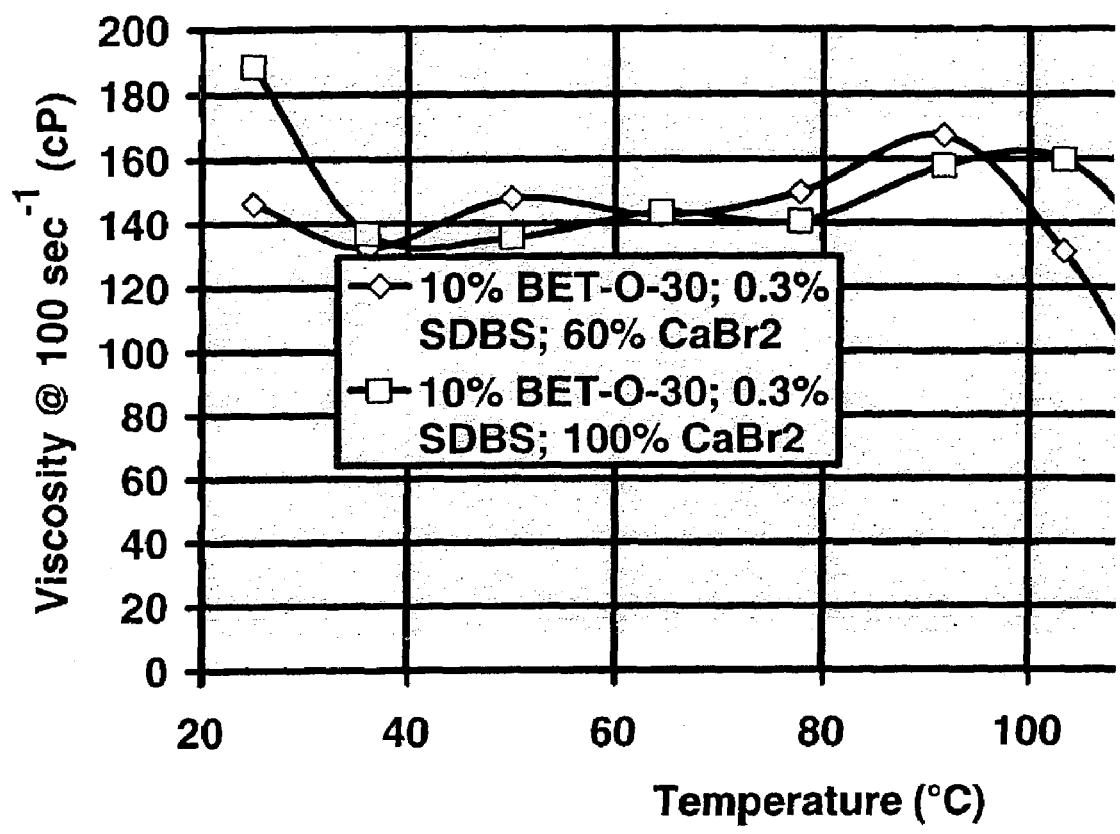
FIG. 2 shows the rheology of prior art viscoelastic surfactant gels in two other brines.

FIG. 2 shows the rheology of 10% BET-O-30 with 0.3% SDBS in two different $CaBr_2$ brines. In contrast to $CaCl_2$ the fluids made with $CaBr_2$ showed similar rheological profiles for the two different brine densities examined. Up to about 104° C. (220° F.), the two fluids had a nearly linear viscosity of about 130 cP at 100 sec $^{-1}$. The temperature up to which the viscosity was at least about 50 cP was up to about 121° C. (250° F.) with 60% $CaBr_2$ (1.38 kg/L) (11.50 ppg) and at least 127° C. (260° F.) with 100% $CaBr_2$ (1.56 kg/L) (12.98 ppg). For uses at which lower viscosities at this shear rate can be used, the maximum useful temperature would be even higher. The fluids of FIGS. 1 and 2 were all shear thinning (in the conventional sense).

The viscosities in divalent brines or monovalent brines for this surfactant/co-surfactant combination (10% BET-O-30 with 0.3% SDBS) are shown by the data in Tables 1 and 2 (monovalent) and in FIGS. 1 and 2 (divalent); the only difference was in the brines.

TABLE 1

| COMPO-SITION | TEMP (° F.) | N' | K | VISCOSITY 40 SEC^-1 | 100 SEC^-1 | 170 SEC^-1 |
|---|---|---|---|---|---|---|
| 10% BET-O-30 0.3% SDBS | 82 | 0.754 | 0.013 | 251 | 200 | 176 |
| | 110 | 0.127 | 0.1373 | 263 | 118 | 74 |
| | 129 | 0.095 | 0.1436 | 244 | 106 | 66 |
| | 153 | 0.068 | 0.1973 | 304 | 129 | 79 |

TABLE 1-continued

| COMPO-SITION | TEMP (° F.) | N' | K | VISCOSITY 40 SEC^-1 | 100 SEC^-1 | 170 SEC^-1 |
|---|---|---|---|---|---|---|
| 8% KCl | 178 | 0.409 | 0.0614 | 332 | 193 | 141 |
| | 203 | 0.792 | 0.006 | 133 | 110 | 99 |
| | 210 | 0.676 | 0.0049 | 71 | 53 | 44 |
| | 243 | 0.445 | 0.0065 | 40 | 24 | 10 |
| | 260 | 0.275 | 0.0085 | 28 | 14 | 10 |
| | 279 | 0.144 | 0.0111 | 23 | 10 | 7 |

TABLE 2

| COMPO-SITION | TEMP (° F.) | N' | K | VISCOSITY 40 SEC^-1 | 100 SEC^-1 | 170 SEC^-1 |
|---|---|---|---|---|---|---|
| 10% BET-O-30 0.3% SDBS 15% KCl | 78 | 0.295 | 0.1287 | 457 | 240 | 165 |
| | 115 | 0.349 | 0.0688 | 298 | 164 | 116 |
| | 127 | 0.086 | 0.1842 | 303 | 131 | 81 |
| | 149 | 0.061 | 0.2271 | 340 | 144 | 87 |
| | 174 | 0.139 | 0.1952 | 390 | 177 | 112 |
| | 200 | 0.692 | 0.012 | 184 | 139 | 118 |
| | 214 | 0.702 | 0.0058 | 93 | 70 | 60 |
| | 238 | 0.576 | 0.0035 | 35 | 24 | 19 |
| | 259 | 0.339 | 0.0052 | 22 | 12 | 8 |
| | 260 | 0.203 | 0.0056 | 14 | 7 | 4 |

EXAMPLE 2

Figure 3:
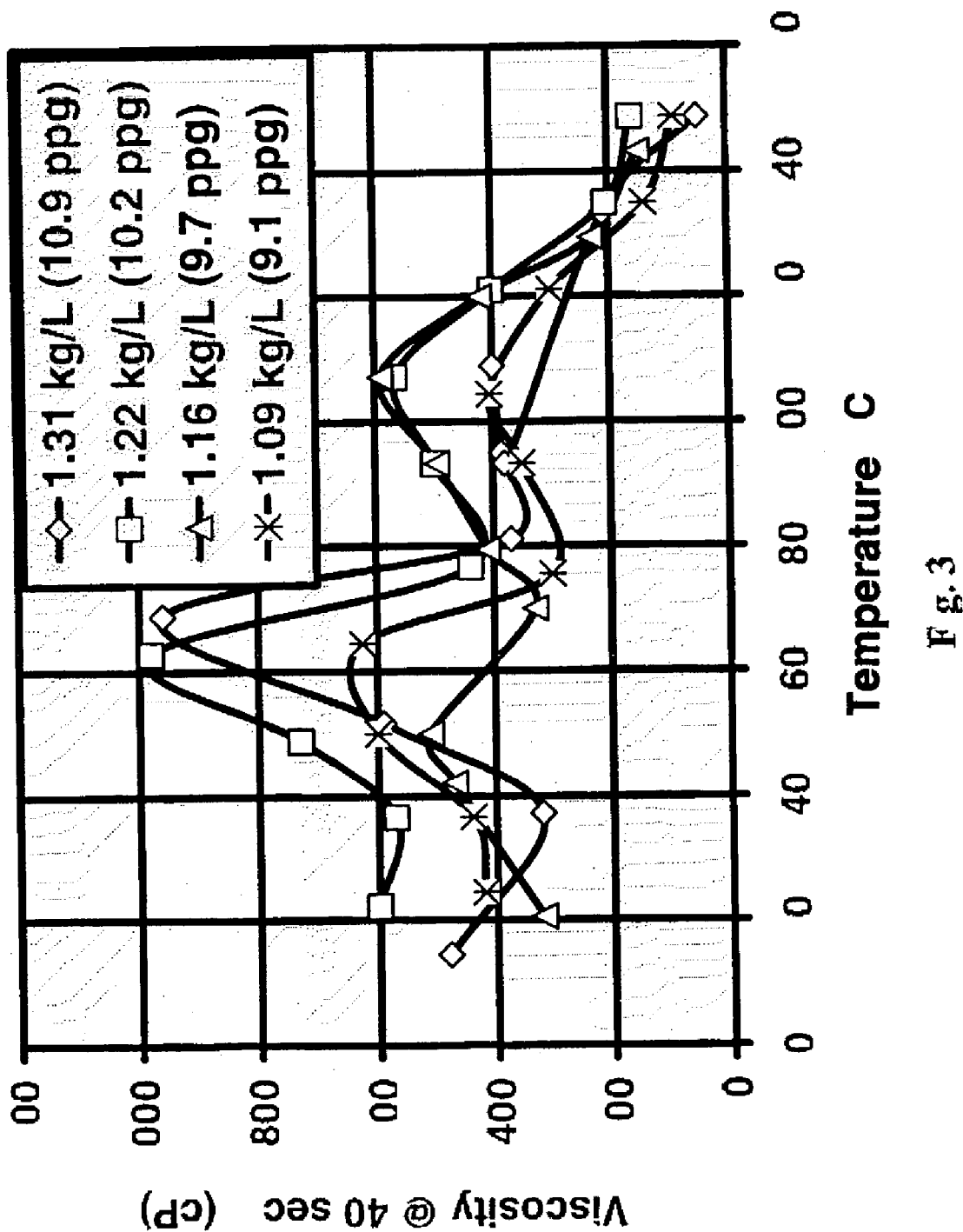
FIG. 3 shows the rheology of a fluid of the invention in four heavy brines.

Data from Fann 50 experiments showed that formulations of 7.5% and 10% BET-E-40 in 1.44 to 2.16 kg/L (12 to 18 ppg) $CaCl_2$ and $CaCl_2/CaBr_2$ mixtures had rheological stability beyond 149° C. (300° F.). FIG. 3 shows the rheology of 7.5% BET-E-40 in $CaCl_2$ with densities ranging from (1.09 to 1.31 kg/L (9.1 to 10.9 ppg). The fluids shown in FIG. 3 also contained 1% methanol.

Figure 4:
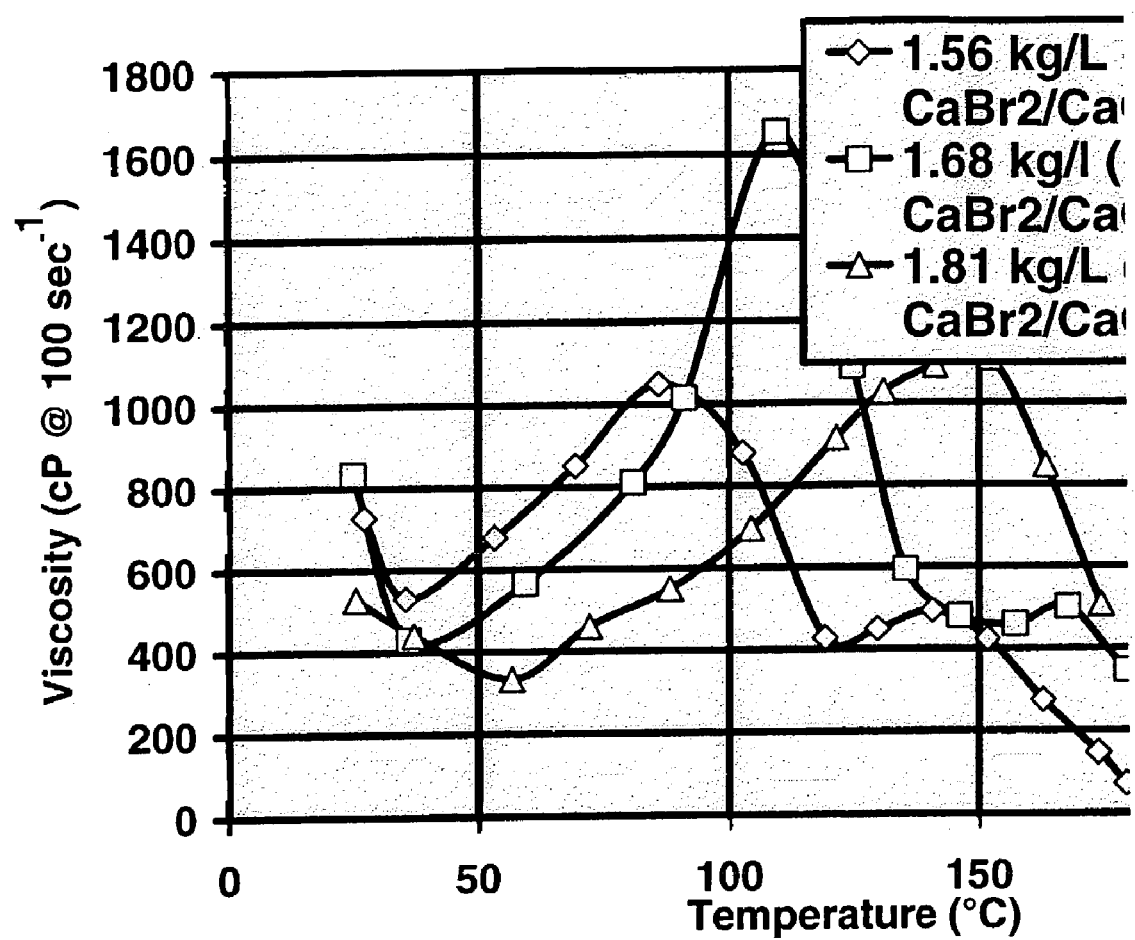
FIG. 4 shows the rheology of a fluid of the invention in three heavy mixed brines.

FIG. 4 shows the rheology of 10% BET-E-40 fluids in mixed $CaCl_2$ and $CaBr_2$ brines with fluid densities up to 1.81 kg/L (15.1 ppg). The $CaBr_2/CaCl_2$ weight ratio in the 1.56 kg/L (13 ppg) fluid was about 2.0; the ratio in the other two fluids was about 2.8. The three fluids were shear thinning (in the conventional sense) over the entire temperature range shown. 1.81 kg/L (15.1 ppg) is the highest density available for this brine.

Table 3 shows rheological data from Fann 50 experiments for a fluid made with 10% as-received BET-E-40 in a 1.56 kg/L (13 ppg) $CaBr_2$ brine at various shear rates. There were no other components in the fluid. When this fluid was cooled after these runs, it looked the same as it had before it was heated; there was no indication of any decomposition of the surfactant. However, when the fluid was heated to above 191 Â° C. (375 Â° F.), the gel did not reform when the fluid was cooled, indicating the high-temperature degradability of this fluid at that temperature. Thus, it is possible using the methods of embodiments of this invention to form aqueous gels at temperatures at which the viscous fluids are not stable for very long. This gives the operator the capability of using viscous fluids at extremely high temperatures and then having the viscosity of the fluid decrease naturally without the need for any deliberate inclusion of a breaker or breaker precursor; without the need for a preflush or postflush designed to bring about an eventual viscosity reduction; and without the need for flow of formation fluids into contact with the viscous fluid.

TABLE 3

| TEMP | Viscosity | | | | |
|---|---|---|---|---|---|
| (° F.) | 1 S^-1 | 10 S^-1 | 40 S^-1 | 100 S^-1 | 170 S^-1 |
| 87 | 3433 | 919 | 366 | 246 | 182 |
| 104 | 3571 | 920 | 356 | 237 | 173 |
| 146 | 12825 | 2302 | 693 | 413 | 278 |
| 204 | 28947 | 4655 | 1298 | 749 | 491 |
| 249 | 15048 | 2373 | 652 | 374 | 244 |
| 277 | 18065 | 2611 | 676 | 377 | 242 |
| 302 | 1713 | 781 | 451 | 356 | 297 |
| 311 | 781 | 480 | 341 | 295 | 264 |
| 323 | 266 | 238 | 220 | 213 | 207 |
| 325 | 251 | 225 | 207 | 201 | 195 |
| 333 | 147 | 149 | 152 | 152 | 153 |
| 353 | 42 | 58 | 73 | 81 | 87 |
| 362 | 18 | 31 | 46 | 54 | 61 |
| 375 | 4 | 11 | 24 | 33 | 42 |

In addition to this excellent rheological performance in heavy brines, as shown in FIGS. 3 and 4, the low friction pressure characteristic (not shown) of VES fluids is also advantageous for CT cleanout applications, especially in deep wells. The drag reduction of VES fluid has been well documented in CT fracturing treatments and CT cleanout jobs using other VES systems.

EXAMPLE 3

Figure 5:
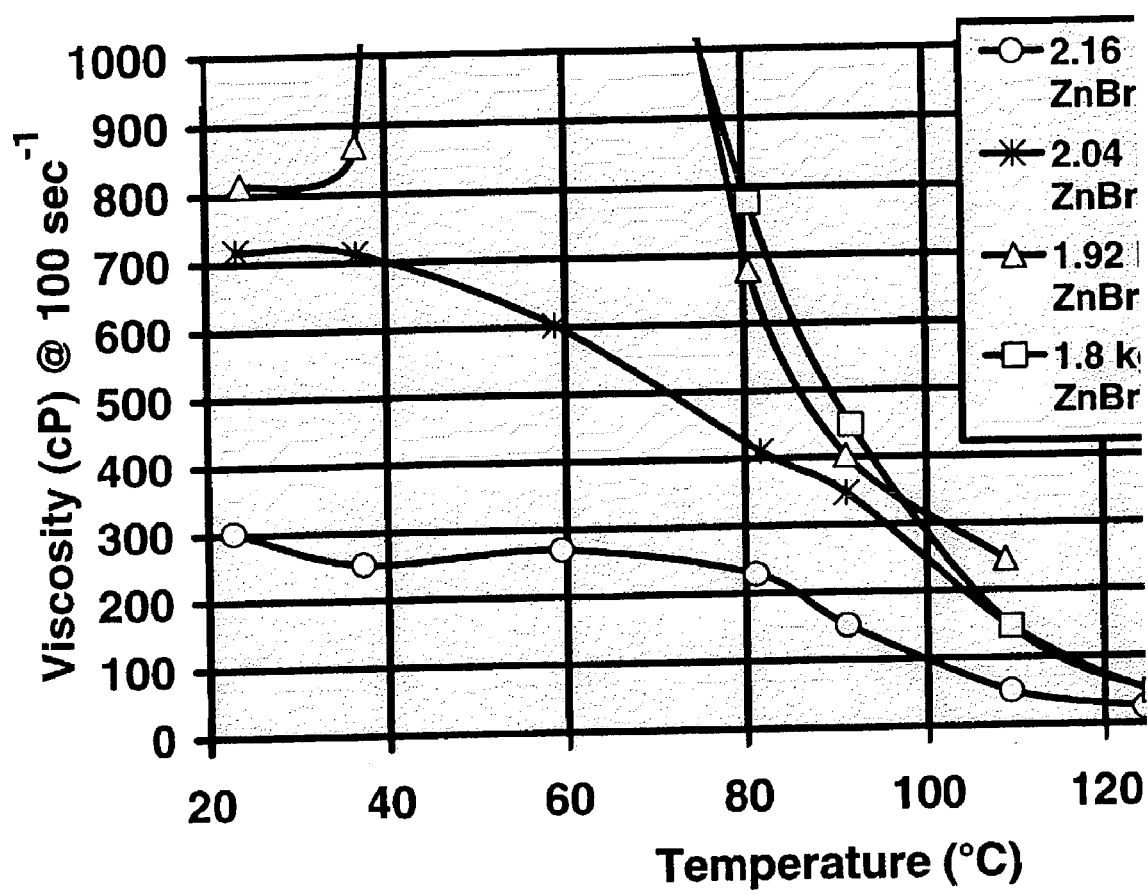
FIG. 5 shows the rheology of a fluid of the invention in four very dense mixed brines.
Figure 6:
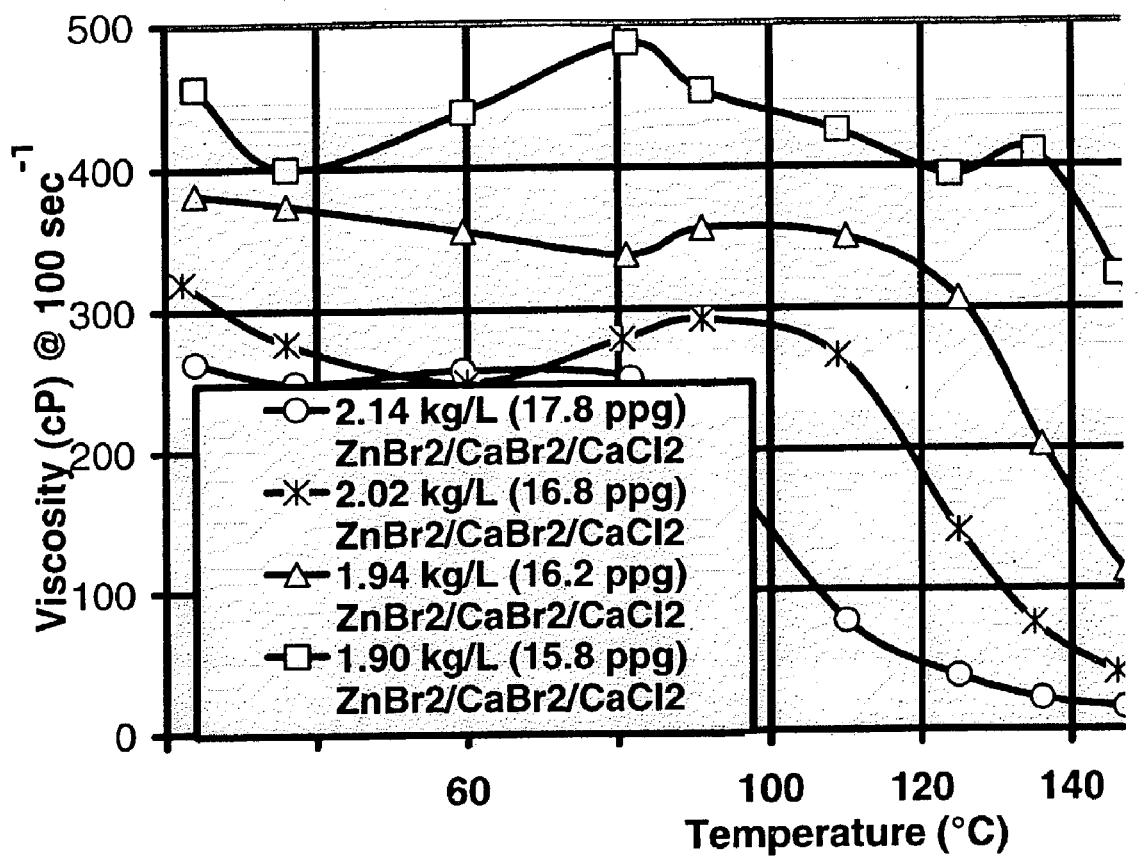
FIG. 6 shows the rheology of a fluid of the invention in four very dense mixed brines.

FIGS. 5 and 6 show the rheology of stable VES gels made with BET-E-40 and mixed brines containing zinc bromide. This combination clearly extends the upper limits of temperature and brine density of these systems beyond what was previously achievable. All the fluids contained 10% as-received BET-E-40 by volume. The ZnBr$_2$/CaBr$_2$ brines (FIG. 5) were made by diluting a 2.30 kg/L (19.2 ppg) ZnBr$_2$/CaBr$_2$ brine (the highest density obtainable with this brine) with water; the ZnBr$_2$/CaBr$_2$/CaCl$_2$ brines (FIG. 6) were made by diluting that brine with 1.39 kg/L (11.6 ppg) CaCl$_2$ brine. Again, all of these fluids were shear thinning (in the conventional sense) under all conditions except that the fluid of FIG. 6 in the 2.02 kg/L (16.8 ppg) brine was essentially Newtonian at temperatures of about 146 Â° C. (295 Â° F.) and higher. It is clear that depending upon the viscosity needed, some of these fluids can be used at temperatures in excess of about 177 Â° C. (350 Â° F.).

EXAMPLE 4

Figure 7:
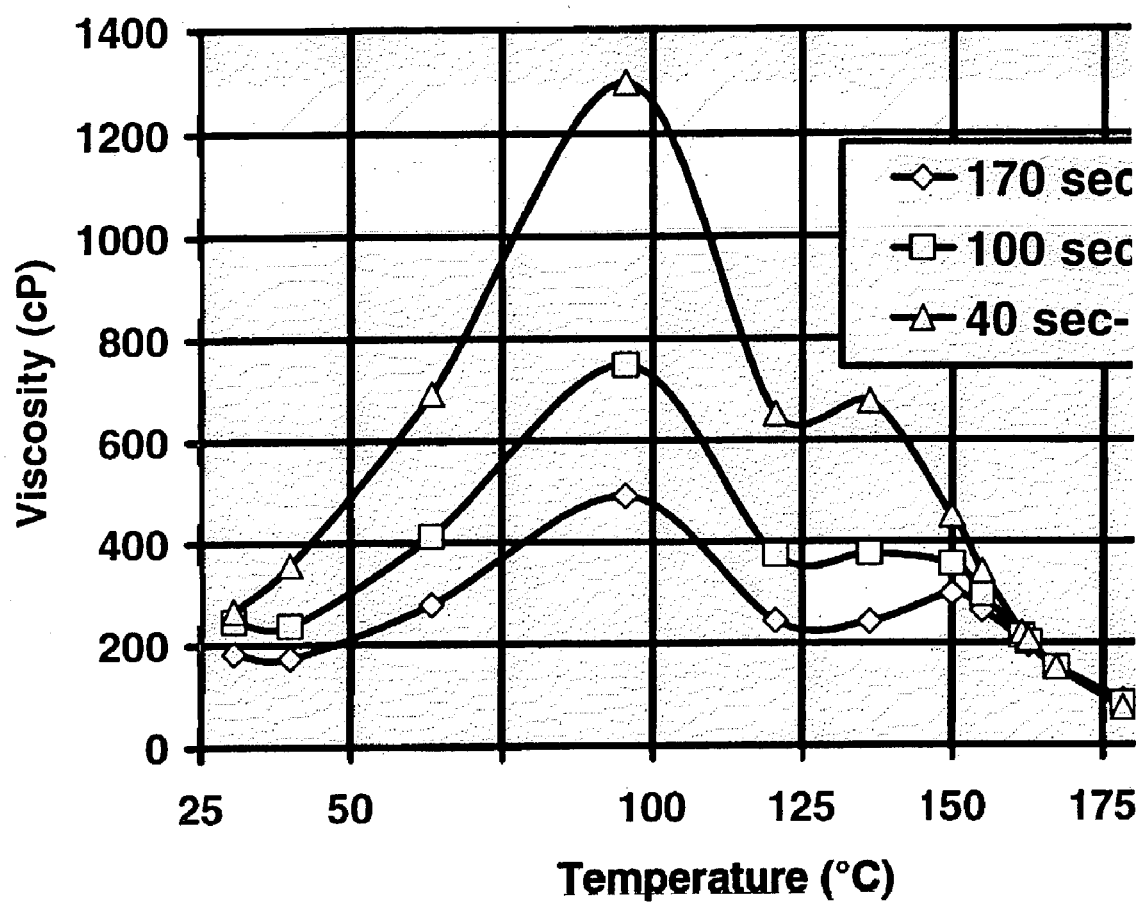
FIG. 7 shows the rheology of a fluid of the invention in a heavy brine at three different shear rates.
Figure 8:
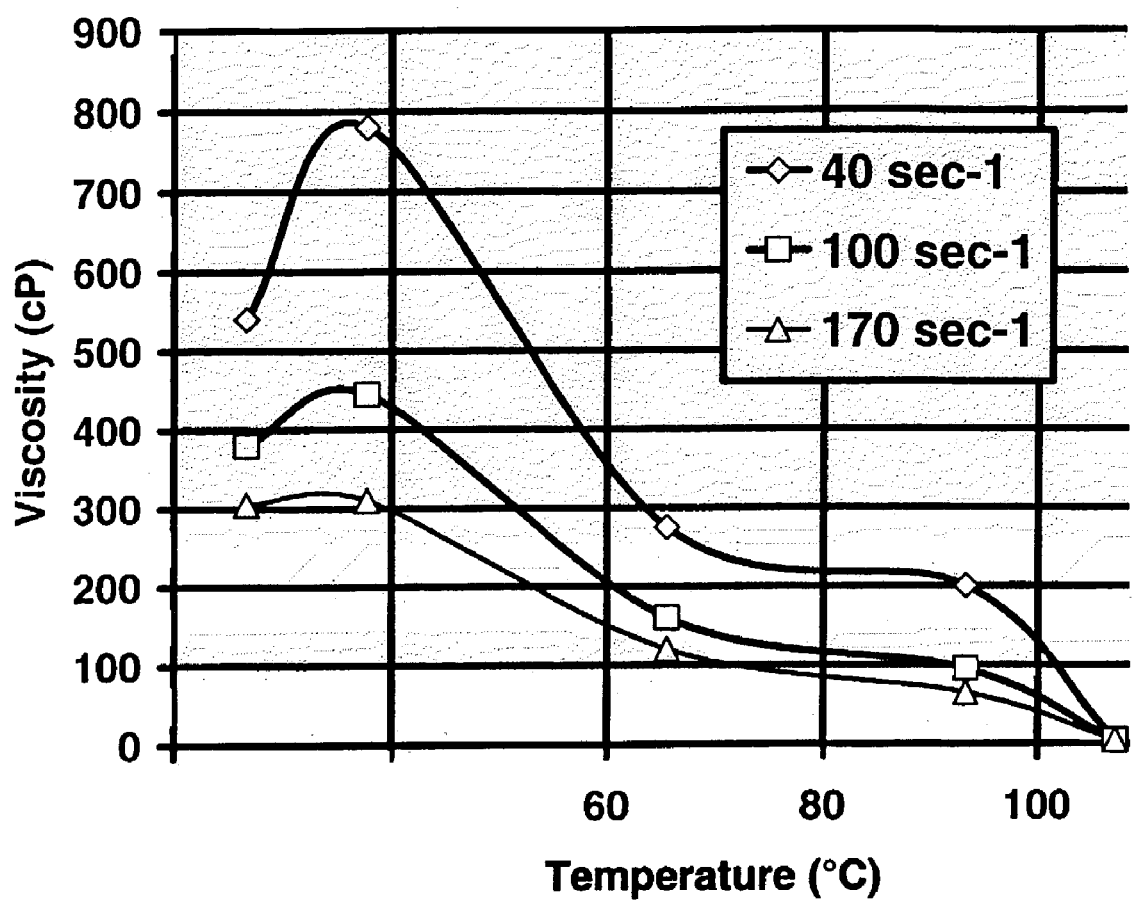
FIG. 8 shows the rheology of the fluid of FIG. 7 at three different shear rates after aging at elevated temperature for 24 hours.
Figure 9:
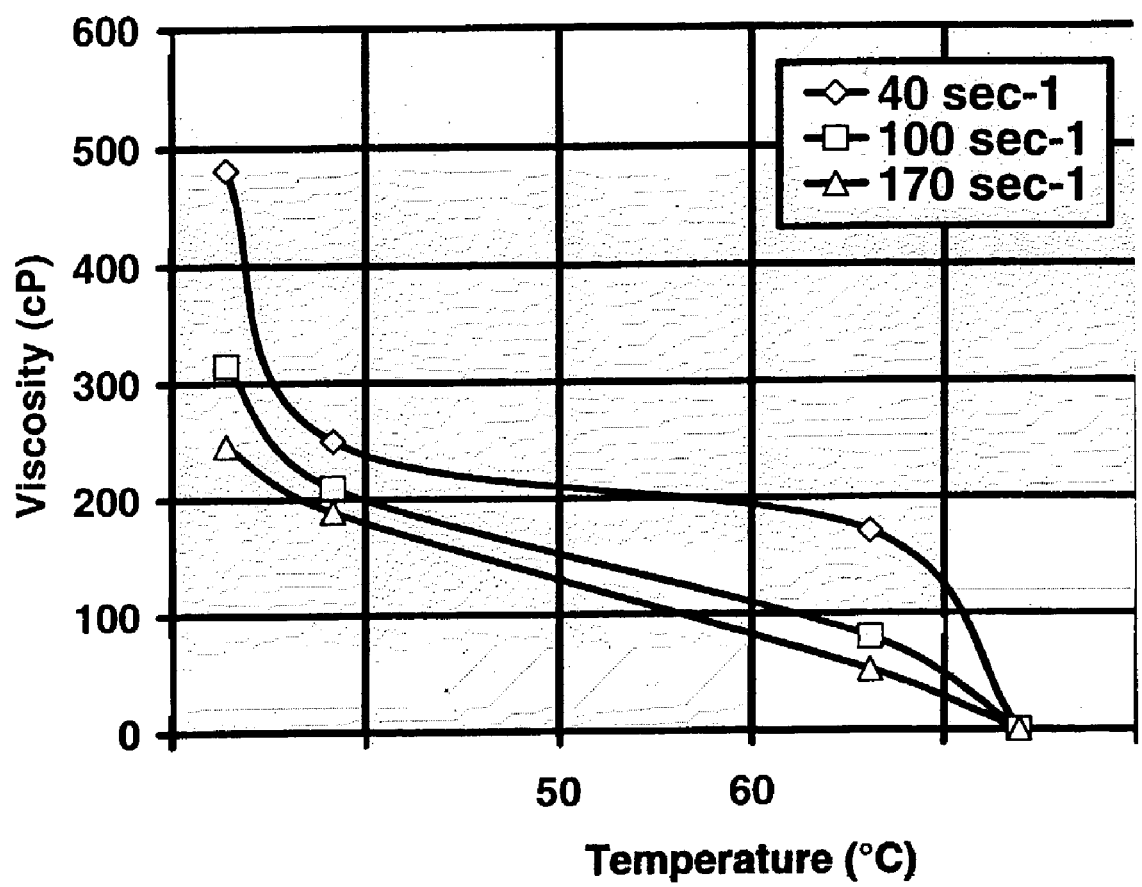
FIG. 9 shows the rheology of the fluid of FIG. 7 at three different shear rates after aging at elevated temperature for 48 hours.

In these experiments, fluids made with 10% BET-E-40 in 1.52 kg/L (12.7 ppg) CaBr$_2$ brine were aged at 160 Â° C. (320 Â° F.) for 24 or 48 hours. FIG. 7 shows the rheology of the freshly made sample on a Fann 50; FIG. 8 shows the rheology after aging at 160 Â° C. (320 Â° F.) for 24 hours; and FIG. 9 shows the rheology after aging at 160 Â° C. (320 Â° F.) for 48 hours. These results demonstrate that the fluids of embodiments of the invention are stable at high temperatures for a long enough time to be useful in many oilfield applications but that they then degrade without the need for dilution by water, oil or condensate and without the need for adding breakers or breaker precursors.

EXAMPLE 5

Figure 10:
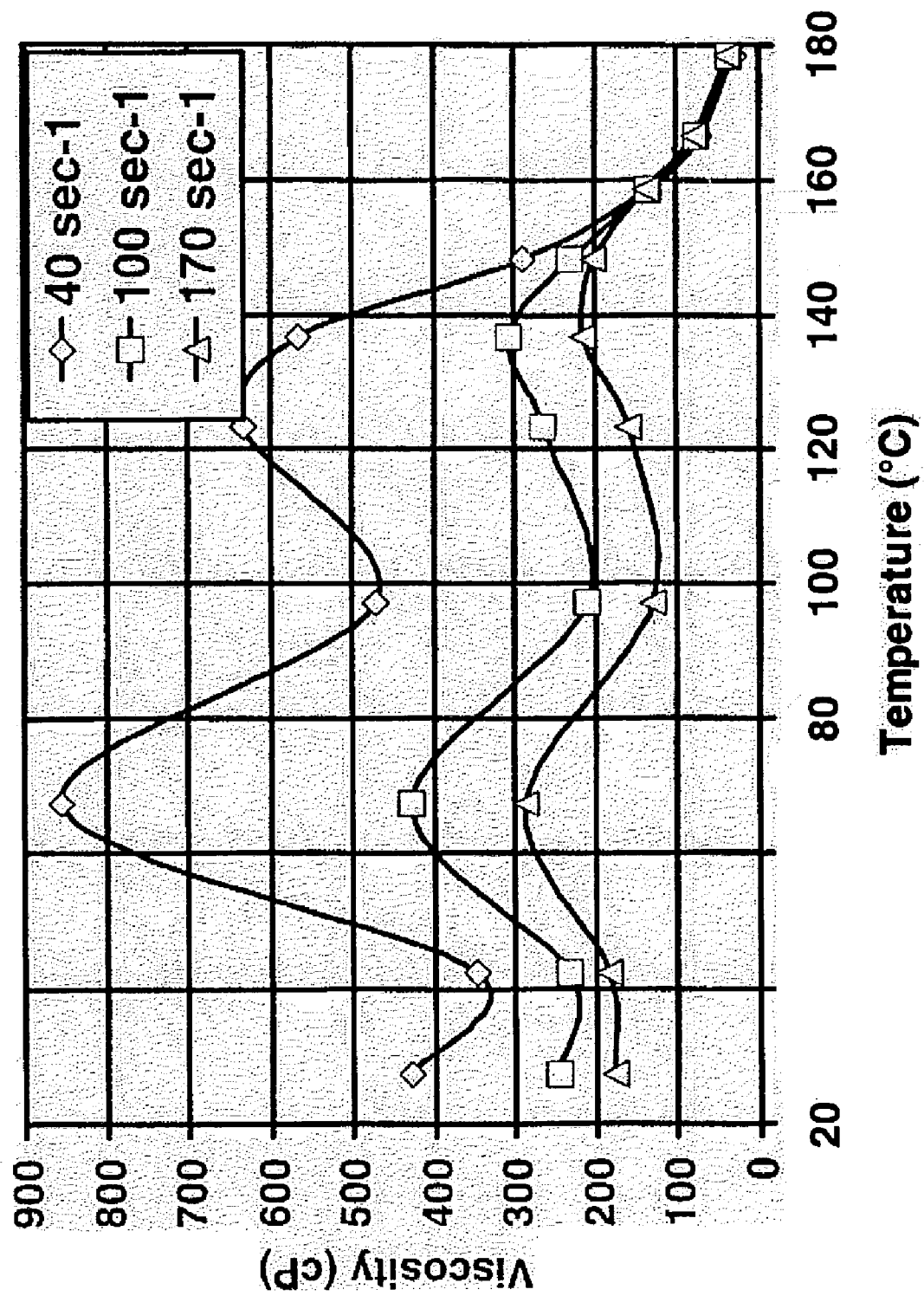
FIG. 10 shows the rheology of a fluid of the invention in a heavy brine at three different shear rates after aging at elevated temperature for 24 hours.
Figure 11:
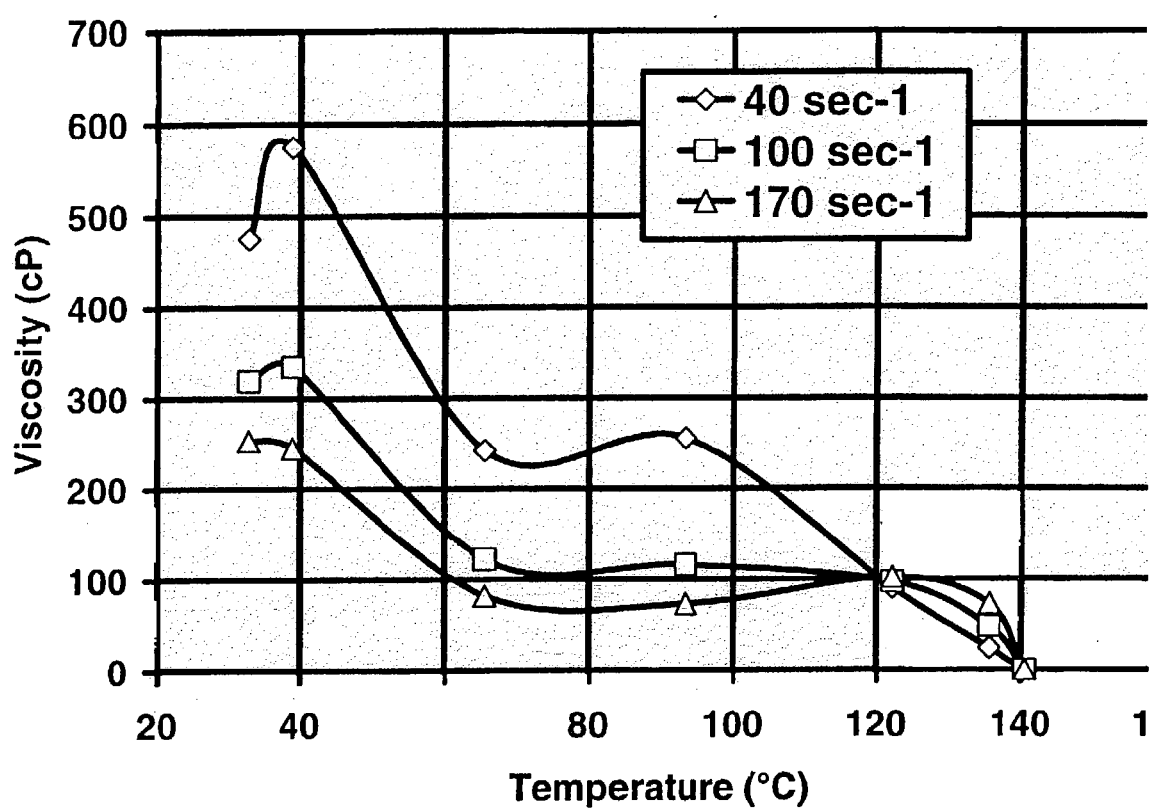
FIG. 11 shows the rheology of a fluid of the invention in a heavy brine at three different shear rates after aging at elevated temperature for 48 hours.
Figure 12:
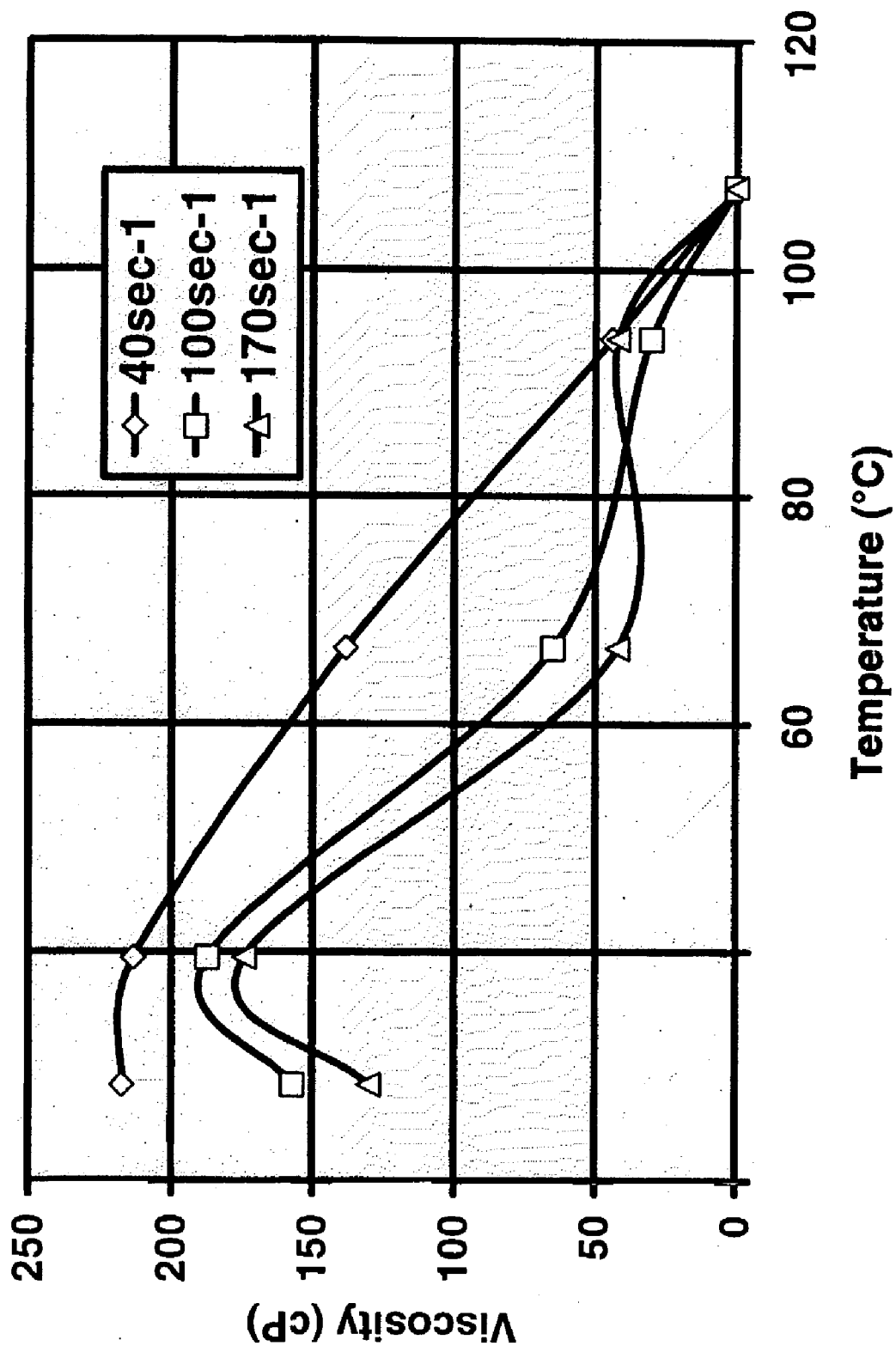
FIG. 12 shows the rheology of a fluid of the invention in a heavy brine at three different shear rates after aging at elevated temperature for 72 hours.

In these experiments, fluids made with 10% BET-E-40 in 1.52 kg/L (12.7 ppg) CaBr$_2$ brine and 10% methanol were aged at 160 Â° F. (320 Â° F.) for 24, 48 or 72 hours. FIG. 10 shows the rheology after aging at 160 Â° C. (320 Â° F.) for 24 hours; FIG. 11 shows the rheology after aging at 160 Â° C. (320 Â° F.) for 48 hours; FIG. 12 shows the rheology after aging at 160 Â° C. (320 Â° F.) for 72 hours.

It is clear by comparison to the data in Example 4 that in these particular systems the added methanol increased the long-term stability of the gels. In other tests (not shown) we have found that about 1% by volume to about 10% methanol is advantageous although more can be used; the preferred amount is about 5%. The same effect would be expected with BET-O-30.

EXAMPLE 6

Figure 13:
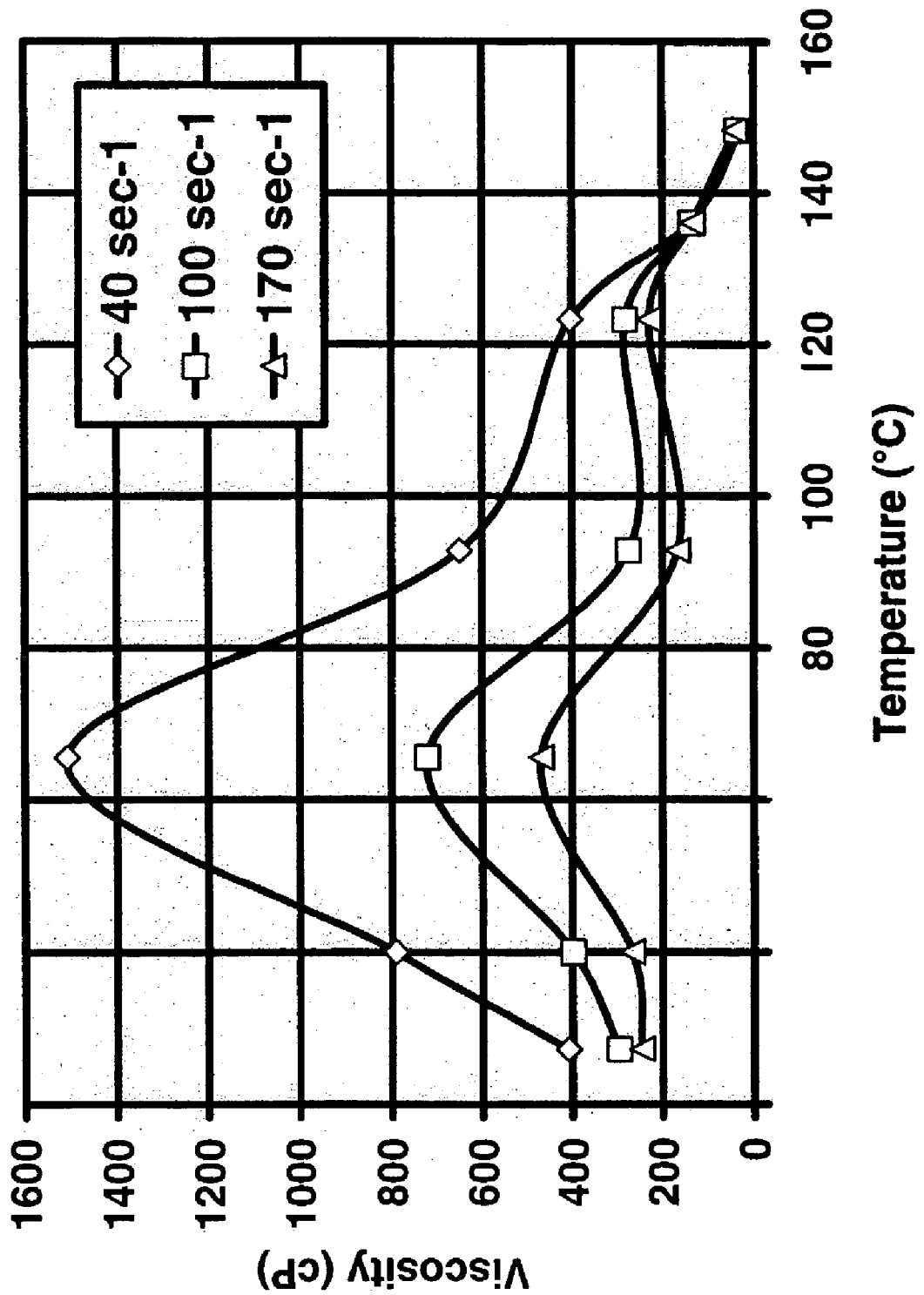
FIG. 13 shows the rheology of a fluid of the invention in a dense monovalent brine.

FIG. 13 shows a gel in a high density brine made with a monovalent cation. The sample was made from 10% as-received BET-E-40 in 1.52 kg/L (12.7 ppg) NaBr. These results clearly show that stable systems can be made and used with high density monovalent-salt brines, although those made with higher valency-salt brines are stable to much higher temperatures.

EXAMPLE 7

Figure 14:
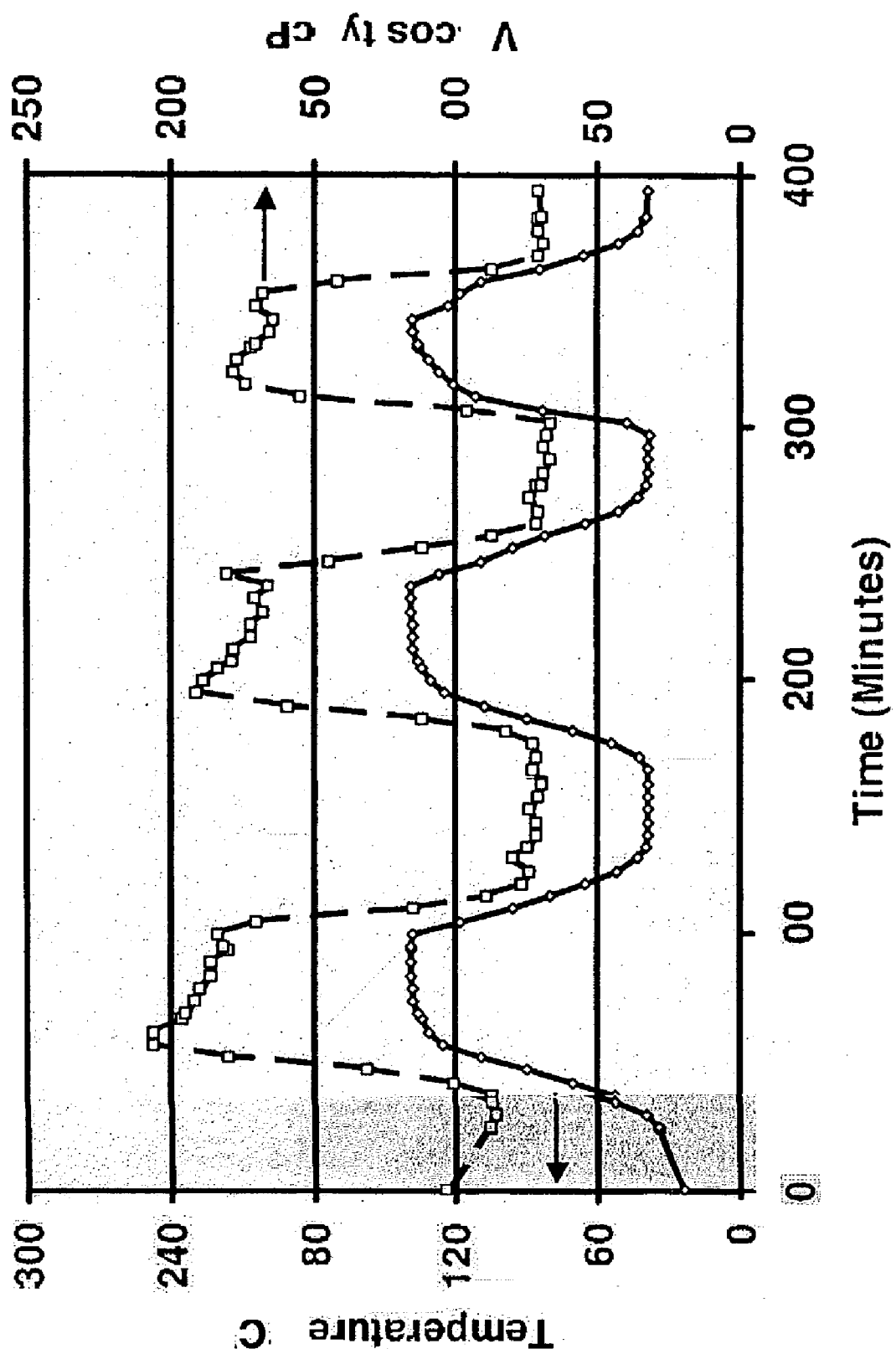
FIG. 14 shows the effect of heating and cooling cycles on the rheology of a fluid of the invention.

Studies were performed to show the effect of heating and cooling cycles on a surfactant fluid of embodiments of the invention. In FIG. 14, the effect of the heating and cooling cycles is illustrated. The fluid contained 10% BET-E-40 in a CaBr$_2$ brine. It can be seen that even when this 1.70 kg/L (14.2 ppg) fluid is repeatedly heated under shear to about 138 Â° C. (280 Â° F.) and cooled to about 24 Â° C. (75 Â° F.) it still retains the desired properties of forming a gel that slowly degrades.

EXAMPLE 8

Figure 15:
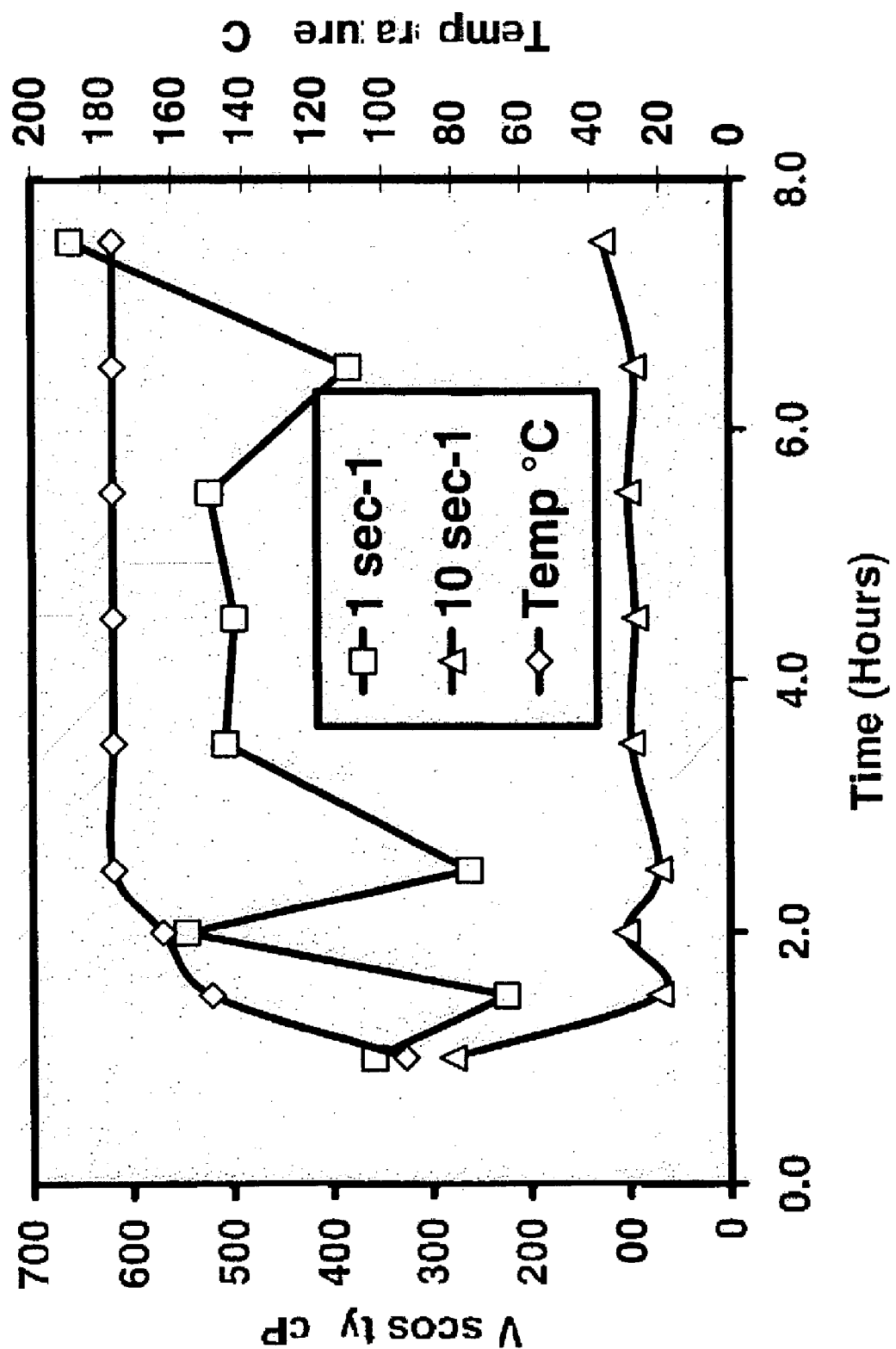
FIG. 15 shows the rheology of a fluid of the invention at very low shear rates.

Experiments were performed at high temperature and very low shear, at which disruptive shear thinning would not mask any chemical decomposition of the surfactant molecules themselves, as opposed to a change in the structure of the fluids. A fluid prepared with 15% as-received BET-E-40 and 5% methanol in a 1.50 kg/L (12.5 ppg) CaBr$_2$ brine was examined in a Fann 50 at 177 Â° C. (350 Â° F.) for an extended period of time. The results are shown in FIG. 15 for shear rates of 1 sec$^{-1}$ and 10 sec$^{-1}$. This fluid forms a gel that is stable at 177 Â° C. (350 Â° F.) for at least 5 hours with no indication of a loss of viscosity.

The invention claimed is:

1. A viscous aqueous high density well treatment fluid composition comprising a brine having a density above about 1.56 kilograms per liter (about 13.0 pounds per gallon); methanol; and a surfactant having the formula:

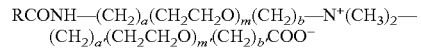

$$RCONH-(CH_2)_a(CH_2CH_2O)_m(CH_2)_b-N^+(CH_3)_2-(CH_2)_{a'}(CH_2CH_2O)_{m'}(CH_2)_{b'}COO^-$$

wherein R is an alkyl group that contains from about 19 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$.

2. The fluid of claim 1 wherein the surfactant is erucylamidopropyl betaine.

3. The fluid of claim 1 wherein the methanol is present at a concentration of from about 1 to about 10 volume percent, preferably from about 1 to about 6 volume percent.

4. A method of stabilizing an aqueous gelled fluid comprising a surfactant having the formula:

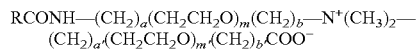

wherein R is an alkyl group that contains from about 19 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$; comprising adding an amount of a water-soluble salt of a divalent metal ion brine to increase the density of the gelled fluid to at least about 1.56 kilograms per liter (13.0 pounds per gallon) and adding from about 1 to about 10 volume percent methanol.

5. The method of claim 4 wherein the brine comprises cations selected from the group consisting of calcium, zinc and mixtures thereof, and anions selected from the group consisting of chloride, bromide and mixtures thereof.

6. A method of increasing the viscosity of an aqueous gelled fluid comprising a surfactant having the formula:

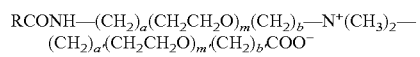

wherein R is an alkyl group that contains from about 19 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$; comprising adding an amount of a water-soluble salt of a divalent metal ion brine to increase the density of the gelled fluid to at least about 1.56 kilograms per liter (13.0 pounds per gallon) and adding from about 1 to about 10 volume percent methanol.

7. The method of claim 6 wherein the brine comprises cations selected from the group consisting of calcium, zinc and mixtures thereof, and anions selected from the group consisting of chloride, bromide and mixtures thereof.

* * * * *